(12) United States Patent
Zee et al.

(10) Patent No.: US 8,484,473 B2
(45) Date of Patent: Jul. 9, 2013

(54) INTER BASE STATION INTERFACE ESTABLISHMENT

(75) Inventors: Oscar Zee, Stockholm (SE); Tomas Nylander, Värmdö (SE); Jari Vikberg, Jarna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 134 days.

(21) Appl. No.: 13/128,477

(22) PCT Filed: Oct. 29, 2009

(86) PCT No.: PCT/EP2009/064317
§ 371 (c)(1),
(2), (4) Date: May 10, 2011

(87) PCT Pub. No.: WO2010/052169
PCT Pub. Date: May 14, 2010

(65) Prior Publication Data
US 2011/0225424 A1    Sep. 15, 2011

Related U.S. Application Data

(60) Provisional application No. 61/112,808, filed on Nov. 10, 2008.

(51) Int. Cl.
*H04L 9/12* (2006.01)

(52) U.S. Cl.
USPC ............................................ 713/171; 726/15

(58) Field of Classification Search
None
See application file for complete search history.

(56) References Cited

U.S. PATENT DOCUMENTS

2008/0167003 A1*  7/2008  Wang et al. .................... 455/411
2009/0109933 A1*  4/2009  Murasawa et al. ............ 370/335
2011/0263282 A1* 10/2011  Rune et al. ..................... 455/507

OTHER PUBLICATIONS

3GPP TS 33.401 V8.0.0—Technical Specification, 3GPP, Jun. 2006.*

* cited by examiner

*Primary Examiner* — Minh Dinh

(57) ABSTRACT

A method of establishing a peer-to-peer IPSec security association between a pair of base stations located within the same or different radio access networks. The base stations communicate with a core network via the same or different security gateways of the core network using respective pre-established IPSec security associations. The method comprises exchanging peer-to-peer IKE security association initiation request and initiation response messages between the base stations using said pre-established security associations.

17 Claims, 12 Drawing Sheets

INTER BASE STATION INTERFACE ESTABLISHMENT

This application claims the benefit of U.S. Provisional Application No. 61/112,808, filed Nov. 10, 2008, the disclosure of which is fully incorporated herein by reference.

TECHNICAL FIELD

The present invention relates to radio communication networks. More specifically, and without limitation, the invention is directed to a system and method for establishing an interface between base stations within the same or different radio access networks.

BACKGROUND

Long Term Evolution (LTE) technology, introduced in 3GPP Release 8, is the next major step in mobile radio communications. It will give a superior user experience and support even more demanding applications, such as interactive TV, user-generated videos, advanced games, and professional services. LTE uses OFDM (orthogonal frequency-division multiplexing) radio access technology together with advanced antenna technologies.

In addition to LTE, 3GPP has specified a flat, IP-based network architecture as part of the System Architecture Evolution (SAE) effort. The aim and design of the LTE/SAE architecture and concepts are to efficiently support mass-market usage of any IP-based service. The architecture is based on, and evolved from, existing GSM/WCDMA core and radio access networks to facilitate simplified operations and smooth cost-effective deployment.

The LTE/SAE architecture reduces operating expenses and capital expenditures. The new, flat architecture, for example, means that only two node types (base stations and gateways) must scale in capacity in order to accommodate large increases in data volumes. In addition, 3GPP and 3GPP2 have agreed to optimize interworking between CDMA and LTE/SAE. CDMA operators will thus also be able to evolve their networks to LTE-SAE and benefit from huge economies of scale and global chipset volumes.

The architecture of the LTE/SAE is shown in FIG. 1. There is only traffical node type in the Radio Access Network (eNodeB), with two node types in the SAE core network (SAE CN), namely a Mobility Management Entity (MME), which takes care of control signalling, and a SAE Gateway (SAE-GW), which takes care of the user data. The SAE-GW is a working name and consists of two different parts, namely the Serving Gateway and the PDN Gateway that are well defined in for example 3GPP TS 23.401. All of these nodes are interconnected by an IP network.

There are three major protocols and interfaces (illustrated in FIG. 1) between these node types. These are S1-MME between eNodeB and MME, S1-U between eNodeB and SAE-GW (or more correctly between the eNodeB and Serving Gateway), and X2 between eNodeBs. The corresponding protocols used in these interfaces are S1AP (S1 Application Protocol), GTP-U (GPRS Tunnelling Protocol User plane), and X2AP (X2 Application Protocol). All of these protocols and interfaces are IP-based. In addition, the network may contain other nodes that are part of the above interface, for example a Home eNodeB Gateway (HeNB GW) between a Home eNodeB (HeNB) and the rest of the nodes in the network.

A common scenario for an operator to connect the LTE RAN and SAE CN involves the leasing of transport capacity with a certain Service Level Agreement (SLA), e.g. specific bandwidth and QoS support, from an Internet Service Provider. This hired transport capacity is treated as un-secure since the traffic may be mixed with traffic from other users and may traverse through, for example, parts of the Internet. We also assume that the core network nodes are located in a secured intranet (so called trusted domain). In order to provide a secured communication between an eNodeB and a SAE CN, a security gateway (SEGW) is introduced in the interface between the Internet and intranet. IPSec tunnels are used in order to connect the eNodeBs towards the core network intranet via the SEGWs.

FIG. 2 shows some examples in which eNodeBs (in the Internet) are connected to the SAE CN nodes using IPSec tunnels towards the SEGWs. The S1-MME and the S1-U are established over the IPSec tunnels. It is also shown that an X2 interface between two eNodeBs can traverse either through one or two SEGW(s) depending on whether the eNodeBs are connected to the same or to different SEGW(s).

There are several factors which impact the pricing of the leased transport capacity. These could be for example bandwidth, Quality of Service (QoS), and the number of public IP addresses provided. In order to minimize the need for public IP addresses, an eNodeB can be located behind a firewall with Network Address Translation (NAT). The NAT is normally allocated one IP address from a pool of publicly registered IP addresses by the ISP. It then performs source (for outgoing packets) and destination (for incoming packets) address translation between private and public IP address. Use of a NAT requires that IPSec setup may be done for example with the following features in order to bypass the NAT and allow the eNodeBs to communicate with the SEGWs and the nodes in the intranet:

Tunnel mode

ESP

UDP encapsulation of IPSec ESP Packets (RFC 3948)

Intranet IP address allocation during IPsec tunnel establishment via, for example, IKEv2 signalling or DHCP.

FIG. 3 shows the different possibilities for eNodeB topology locations that are important in relation to the establishment of the X2 interface. These are:

1. Intranet—eNodeB is located within the same secure domain (i.e. intranet) as the core network nodes and some other eNodeBs.
2. Internet with no NAT—eNodeB is located outside the secure domain, i.e. in the Internet. In order to access the secure domain, eNodeB needs to establish an IPSec tunnel towards the SEGW.
3. Internet with NAT—eNodeB is located outside the secure domain, i.e. in the Internet. In order to save the amount of public IP addresses (or other reasons), the eNodeB is located behind a NAT. In this case, an IPSec tunnel is also needed between eNodeB and SEGW.

There are two different methods for establishing an X2 connection between two eNodeBs when both eNodeBs are located in the Internet. The first method is routing traffic through the already established IPSec tunnels between eNodeBs and SEGWs. The advantage of this method is simplicity, since all the necessary connections are already established during initial setup of the S1 interfaces when IPsec tunnels are also established between the eNodeBs and the SEGWs. The drawback of this method is that the X2 data will go through at least two encryption/decryption chains and will introduce additional and unnecessary delays in the X2 interface, and that additional capacity is needed in the SEGW. This is not desirable from either a mobility or performance point of view.

A second method that can be applied when at least the destination eNodeB is not located behind a NAT, is to establish a direct IPSec tunnel between the eNodeBs. The advantage of this method is that the X2 data will only go through one single encryption/decryption chain. The drawback is that, for each X2 connection, certification between the eNodeBs is needed (i.e. to authenticate the other eNodeB and to verify that the eNodeB is allowed to establish the IPsec tunnel), in turn requiring a complex certification structure on the eNodeB if Automatic Neighbor Relation (ANR) is involved in the X2 establishment (since X2 establishment will be done in a more "ad hoc" manner, and each eNodeB needs to have capability to certify any potential "neighbor" during runtime).

SUMMARY

It is an object of the present invention to minimize the need for certification between eNodeBs during X2 connection setup. It is also desirable to minimize the number of encryptions and decryptions performed in the X2 interface established between two different eNodeBs. The approaches presented here piggyback on pre-existing secured intranet tunnels in order to certify the eNodeBs, either by exchanging the IKE_SA_INIT message in the existing secured child Security Association (SA), or by proprietary messages on the existing IKE_SA in order to certify the eNodeBs. After the initial exchange the eNodeBs can start their direct peer to peer communication.

According to a first aspect of the present invention there is provided a method of establishing a peer-to-peer IPSec security association between a pair of base stations located within the same or different radio access networks. The base stations communicate with a core network via the same or different security gateways of the core network using respective pre-established IPSec security associations. The method comprises exchanging peer-to-peer IKE security association initiation request and initiation response messages between the base stations using said pre-established security associations.

The solution may involve sending the IKE initiation and initiation response messages between the base stations via IPsec secured communication channels to the security gateway(s) or via child channels associated with those IPSec secured communication channels.

The security association initiation request and initiation response messages may be the IKE messages IKE-SA-INIT request and response messages.

Following the exchange of the IKE security association initiation request and initiation response messages, the method may comprise subsequently sending from the base station initiating the peer-to-peer IPSec security association to the peer base station, an IKE_AUTH message via an unsecured IP network. This may involve UDP encapsulating the IKE_AUTH message.

Said peer base station may associate messages received from the initiating base station with said base station using only a Security Parameter Index assigned to the Security Association. Alternatively, the peer base station may associate messages received from the initiating base station with said base station using a Security Parameter Index assigned to the Security Association and an IP address of the initiating base station, the IP address of the initiating base station being conveyed to the peer base station as a NAT DETECTION SOURCE IP within Notify payload of the IKE initiation request message.

The method may comprise exchanging said peer-to-peer security association initiation request and initiation response messages between the base stations via encrypted child security associations of said pre-existing security associations existing between the respective base station and security gateway pairs. The data secured with the peer-to-peer security association may then be sent subsequently over child security associations with null encryption between the base station and security gateway pairs.

The method may comprise including in at least said IKE security association initiation request a flag identifying to the or each security gateway that the peer-to-peer security association should be added to its Security Policy Database in association with an IP address of the peer base station. The data sent subsequently using the peer-to-peer security association may then be forwarded by a security gateway without a need for payload encryption or decryption.

The method may comprise, at the base station, sending the peer-to-peer security association initiation request, determining whether or not the peer base station is located behind a Network Address Translator, NAT, and using the result to determine how to proceed with the peer-to-peer security association establishment.

In a particular embodiment of the invention, the base stations are eNodeBs within a LTE-based radio access network, and said core network is a SAE-based network.

The method may comprise determining whether subsequent messages after the said association initiation request and initiation response messages are to be exchanged via said security gateways or via a public IP network. This step comprises, in the former case, not including a public IP address of the base station initiating the peer-to-peer security association as a NAT DETECTION SOURCE IP within Notify payload of the IKE initiation request message, and in the latter case including this as a NAT DETECTION SOURCE IP.

According to a second aspect of the present invention there is provided a base station for use in a radio access network and configured to communicate with a core network via a security gateway of the core network using a pre-established IPSec security association. The base station comprises a security handling unit for exchanging peer-to-peer IKE security association initiation request and initiation response messages with a peer base station using said pre-established security association in order to establish a peer-to-peer security association with said peer base station.

The security handling unit may be configured to send to the peer base station, an IKE_AUTH message via an unsecured IP network following the exchange of the IKE security association initiation request and initiation response messages. Alternatively, the security handling unit may be configured to send to the peer base station, an IKE_AUTH message via said security gateways following the exchange of the IKE security association initiation request and initiation response messages The base station may further comprise components for implementing the method steps set out above in respect of the first aspect of the invention. For example, a component may be provided for UDP encapsulating the IKE-AUTH message, whilst a component may be provided for including, or not including, a public address of the base station as NAT DETECTION SOURCE IP within a Notify payload of an IKE initiation request message. This latter feature may be required in order to indicate to the peer bases station whether or not further exchanges are to be conducted via a public IP network.

According to a third aspect of the present invention there is provided security gateway for securely coupling one or more base stations within a radio access network, to a core network. The security gateway comprises a security handling unit for establishing a first security association to secure traffic exchanged between a first base station within the radio access network and said core network. There is also provided a message handling unit for using said first security association to handle peer-to-peer IKE security association initiation request and initiation response messages exchanged between said first base station and a peer base station. The message exchange results in the establishment of a peer-to-peer security association between the base stations. The message handling unit is further configured to add a security parameter index for the peer-to-peer security association to a local Security Parameter Index, SPI, database together with a message handling instruction for causing packets matching said SPI to be routed onward towards a destination one of the base stations.

According to a fourth aspect of the present invention there is provided method of enabling the establishment of a peer-to-peer IPSec security association between a pair of base stations located within the same or different radio access networks and where at least one of the base stations is couple to a core network via a security gateway. The method comprises, at the security gateway, establishing a first security association to secure traffic exchanged between a first base station within the radio access network and said core network. Said first security association is then used to handle peer-to-peer IKE security association initiation request and initiation response messages exchanged between said first base station and a peer base station, the message exchange resulting in the establishment of a peer-to-peer security association between the base stations. A security parameter index for the peer-to-peer security association is added to a local Security Parameter Index, SPI, database together with a message handling instruction for causing packets matching said SPI to be routed onward towards a destination one of the base stations.

DETAILED DESCRIPTION

The methods and apparatus described in this document are relevant in particular to LTE/SAE, but could also be applied in other cases. Thus, while the description is concerned with eNodeBs (Evolved Universal Terrestrial Radio Access Network (E-UTRAN) NodeBs) in a LTE/SAE network and how the X2 interface between eNodeBs can be established, similar approaches may also apply to other types of base stations and interfaces. For example, they may also apply to E-UTRAN Home eNodeBs (HeNB), the Iur interface in UTRAN, and UTRAN Home NodeBs (HNB). Although the current 3GPP working assumption is that X2 is not used for handover involving HeNBs, this does not exclude other HeNB functions with the X2 interface involved. Nor does it exclude the possibility that X2 would in the future be introduced for handover involving HeNBs.

Three approaches to X2 interface establishment will now be presented.

1. Peer to Peer X2 Setup on eNodeB in Un-Secure Domain

A prerequisite of this approach is that both the source and destination eNodeB are located in an un-secured domain or domains, and that an IPsec tunnel (=ordinary SA) must be established between the SEGW and eNodeB. For example, the IPsec tunnel could have been established for the S1 interface between the eNodeB and the Core Network. The source eNodeB shall also have at least the following information:
1. Topology location of source eNodeB
2. Topology location of destination eNodeB
3. Intranet IP address to destination eNodeB
4. Internet IP address to destination eNodeB This information could be preconfigured in the source eNodeB or downloaded from some network server or retrieved from the destination eNodeB using any of a number of different signaling protocols (e.g. S1 based handover signaling).

This approach applies to the case where at least one of the eNodeBs is not behind a NAT. Here, it is assumed that the source eNodeB is behind a NAT, but that the destination eNodeB is not.

Figure 1:
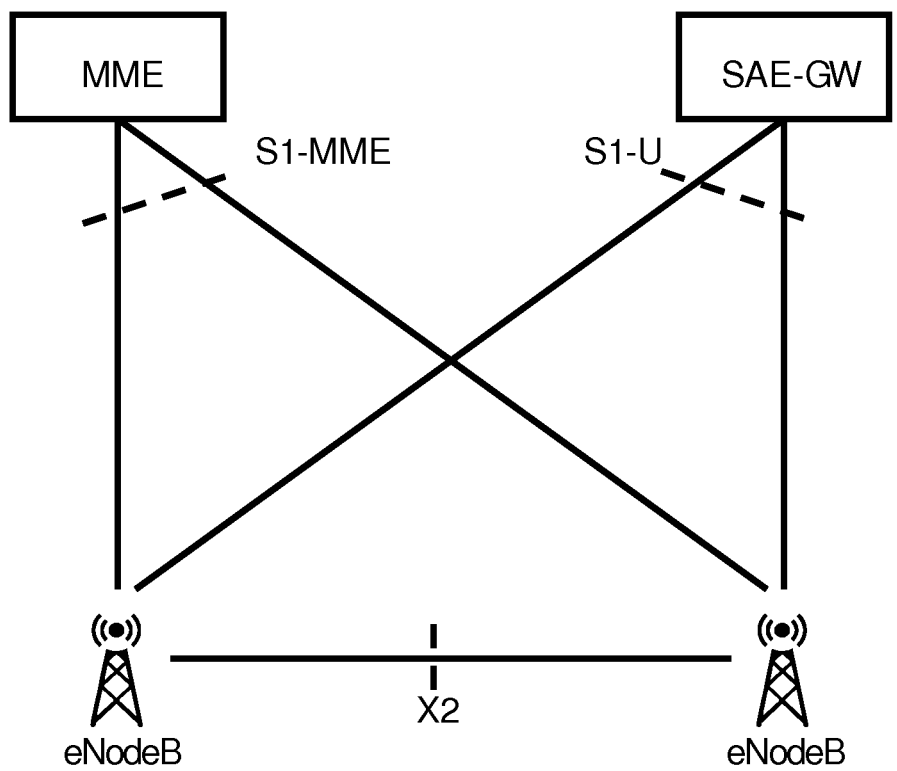
FIG. 1 is a simplified block diagram of the architecture of a LTE/SAE network.
Figure 2:
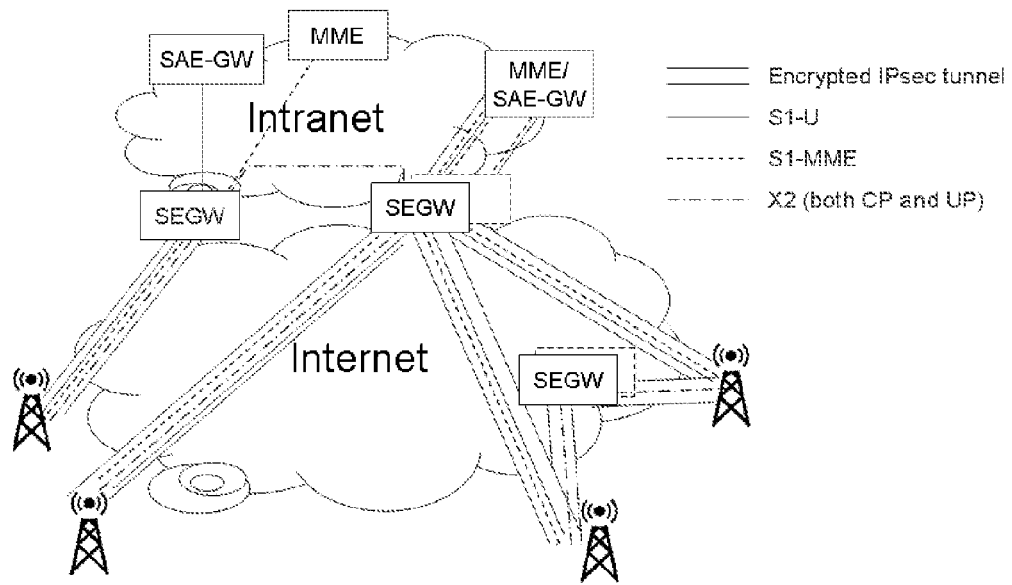
FIG. 2 is a simplified block diagram illustrating examples in which eNodeBs in the Internet are connected to the SAE CN nodes using IPSec tunnels towards the SEGWs.
Figure 3:
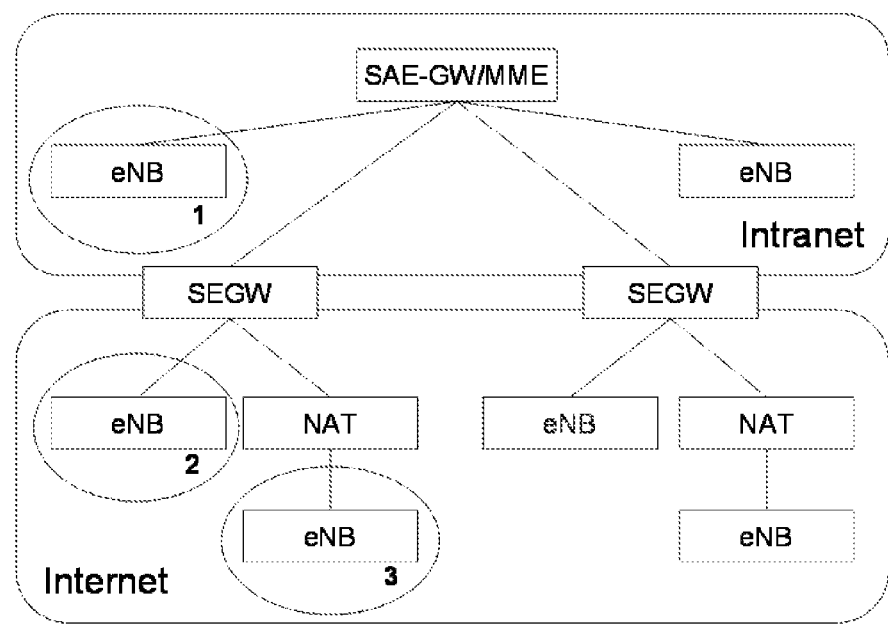
FIG. 3 is a simplified block diagram illustrating different possibilities for eNodeB topology locations that are important in relation to the establishment of the X2 interface.
Figure 4:
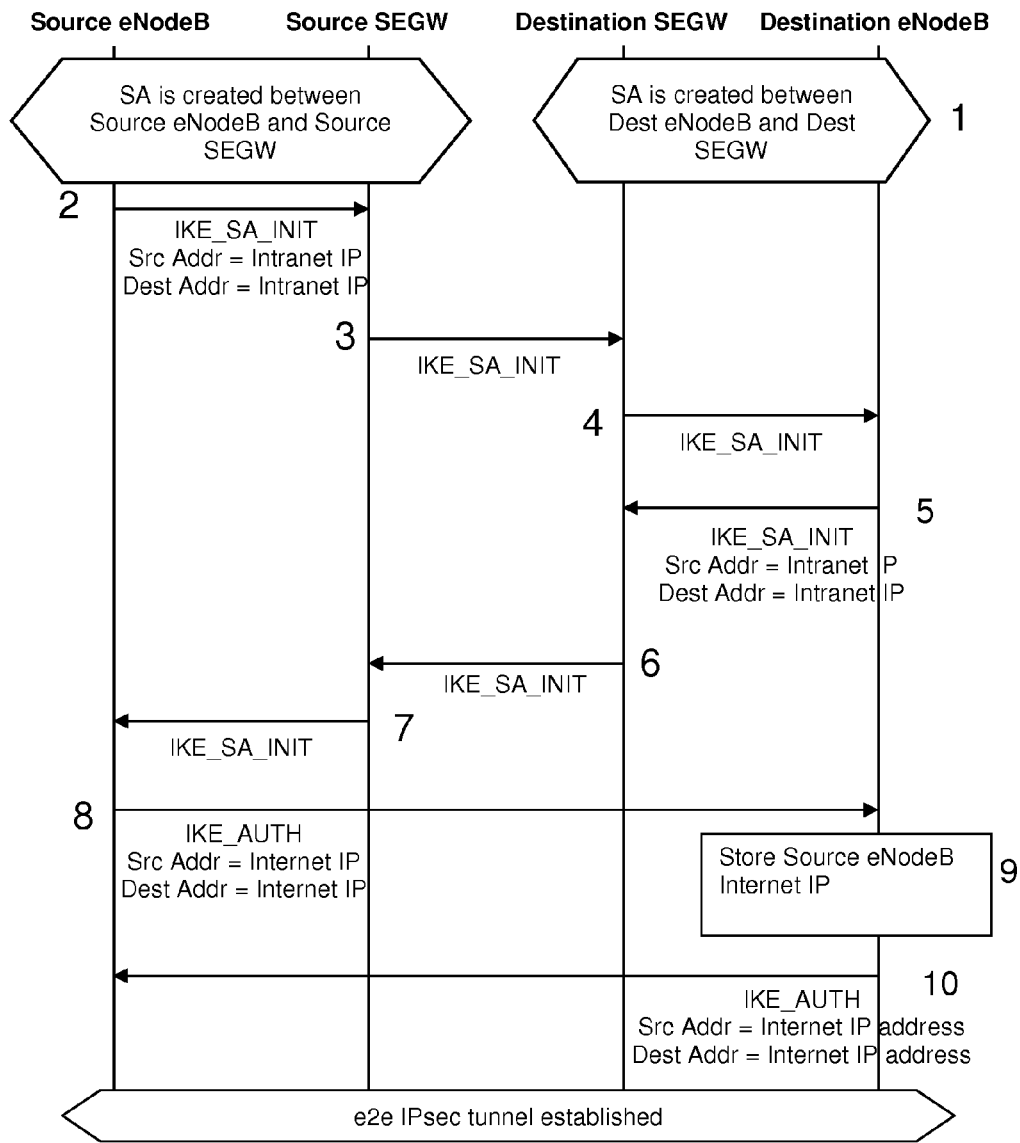
FIG. 4 is a sequence diagram illustrating an embodiment of a method for setting up a peer-to-peer tunnel.

The suggested method for setting up a peer-to-peer tunnel is shown in the sequence diagram of FIG. 4, and comprises the following steps:

1. A source eNodeB wants to establish an X2 connection towards a destination eNodeB, with the source eNodeB being located behind a NAT. At this stage, the source eNodeB knows the topology location for both itself and the destination eNodeB. Intranet and Internet addresses for the destination eNodeB are retrieved. Ordinary SAs between the SEGWs and eNodeBs are established during initialization of, for example, the S1 connection.

2. An IKE_SA_INIT request is sent from the source eNodeB using UDP encapsulation in order to traverse the NAT. This message will be sent through the SA established in step 1 above (and which already bypasses the NAT), with eNodeB Intranet IP addresses as source and destination addresses in the inner IP packet header, i.e. source eNodeB Intranet IP address as the IP source address and destination eNodeB Intranet IP address as the IP destination address. The Source SEGW will strip off the UDP encapsulation header, and authenticate and decrypt the received packet. It will treat the encapsulated packet as a regular Intranet IP packet.
3. This IKE_SA_INIT request message will be routed from source SEGW to destination SEGW using normal IP routing between the SEGWs. The Destination SEGW will treat this packet as a regular Intranet IP packet.
4. The IKE_SA_INIT request is sent to the destination eNodeB. This message will be routed through the SA established in step 1 above, between the destination side SEGW and the destination eNodeB. UDP encapsulation is not required as the destination eNodeB is not behind a NAT.
5. An IKE_SA_INIT response is sent from the destination eNodeB towards the destination side SEGW. This message will be sent through the SA established in step 1 above, with Intranet IP addresses as source and destination address on the inner IP packet header. In this IKE_SA_INIT response, there will be no need for the CERTREQ parameter, since the IKE_SA_INIT was sent over a secured channel and the source eNodeB can be treated as "trusted". The destination side SEGW will strip off the ESP header, and authenticate and decrypt the response. It will treat the response packet as a regular Intranet IP packet. After the destination eNodeB has sent the IKE_SA_INIT response, it will open the appropriate port for receiving further IKE signaling from the peer.
6. The IKE_SA_INIT response message will be routed from destination SEGW to source SEGW using normal IP routing between the SEGWs. The Source SEGW will treat the packet as a regular Intranet IP packet.
7. The IKE_SA_INIT response is sent from the source side SEGW to source eNodeB. This message will be sent through the SA established in step 1 above, and using UDP encapsulation. At this point, the source and destination eNodeBs both possess a shared secret, associated with an IKE SPI.
8. Source eNodeB will send an IKE_AUTH message to Destination eNodeB, directly through the Internet, with Internet IP addresses as eNodeB source and destination addresses, and using UDP encapsulation. This is possible as the source eNodeB knows that the destination eNodeB is located in the Internet without a NAT, and that the UDP port for IPSec at the destination eNodeB is open. No security problems can be foreseen with this method, as the IKE-AUTH message is identified by IKE SPI field, and the message is encrypted using the initial key generated by the IKE_SA_INIT exchange (which was conducted in the secured domain).

It is noted that this approach may require a relaxation in the implementation of IKEv2 in the destination eNodeB, so that the SPI will be the sole identifier of the IPsec SA instead of the triplet of source IP address, destination IP address and SPI (IKE messages sent during the negotiation phase contain only the source and destination eNodeB intranet addresses and not the Internet IP address). An alternative solution might be for the source eNodeB to include in the IKE_SA_INIT (at step 2 above), a Notify Payload with NAT_DETECTION_SOURCE_IP included. The value of the source IP in the NAT detection payload would be the Internet IP-address of the source eNodeB. The destination eNodeB will then be notified that the IKE_AUTH and onwards will be sent via the internet-IP address instead, and will open the appropriate port.

[In the case that the source eNodeB is also located in the Internet without a NAT, the IKE_AUTH message can be sent either with or without UDP encapsulation.]

9. The destination eNodeB will decrypt and authenticate the IKE_AUTH message, using the IKE SPI field as reference. After successful decryption and authentication, the destination eNodeB will store the Internet IP address (and port address in the case of UDP encapsulation) of the Source eNodeB. The reception of the UDP encapsulated IKE_AUTH is the trigger for the destination eNodeB to start using UDP encapsulation towards the source eNodeB.
10. The destination eNodeB will respond to the IKE_AUTH message, via the Internet, back to source eNodeB. Subsequently, all IPSec communication between source and destination eNodeBs will be sent via the Internet. The source eNodeB will continue to UDP encapsulate messages sent towards the destination eNodeB (assuming that the former is located behind a NAT). In the same way, the destination eNodeB will continue to UDP encapsulate messages sent towards the source eNodeB.

The above method will work only if the destination eNodeB is not located behind a NAT firewall. If this is not the case, and rather it is the source eNodeB that is not behind a NAT whilst the destination eNodeB is behind a NAT, the destination eNodeB would not be able to receive any IKE_AUTH message sent by the source eNodeB. To avoid this problem, the destination eNodeB can instead initiate the IKEv2 exchange.

Figure 5:
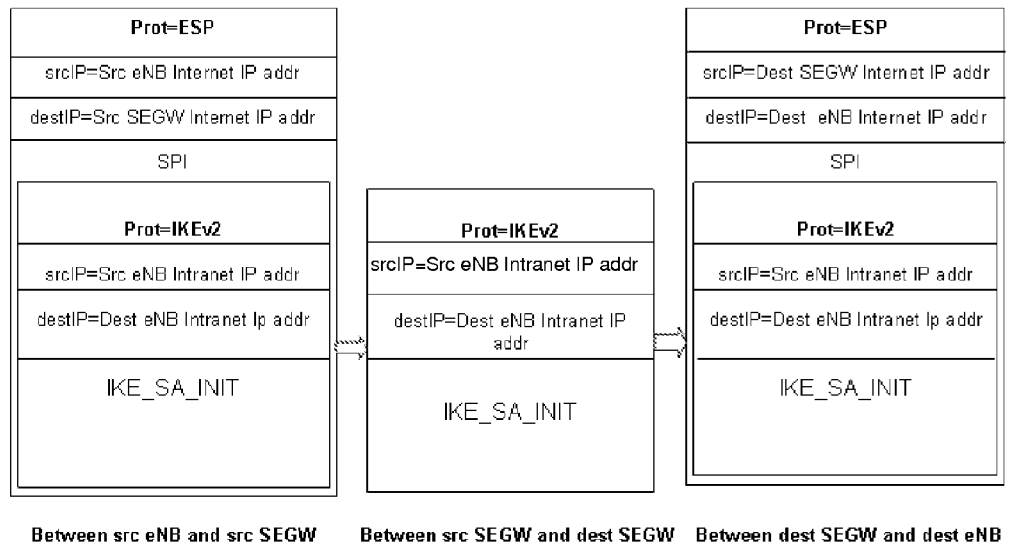
FIG. 5 is a schematic diagram illustrating the packet structure for an IKE_SA_INIT message according to an embodiment of the present invention.

Considering step 4 above, if the destination eNodeB detects that it is located in the Internet behind a NAT, it will reject the IKE_SA_INIT signal and perform a lookup of the Internet IP address of the source eNodeB using the intranet IP-address retrieved from the IKE_SA_INIT. The lookup may employ reverse DNS, i.e. besides the domain name (PTR record), the destination node can also retrieve another record such as Intranet IP address. Once the destination eNodeB has retrieved the Internet IP address registered for the source eNodeB, the destination eNodeB initiates the same sequence towards the source eNodeB, i.e. sending the IKE_SA_INIT message, etc. The advantage of this method is that no special treatment of the IKEv2 exchange is needed. FIG. 5 illustrates schematically the packet structures for the IKE_SA_INIT message, as the message is routed between the source and destination eNodeBs.

Figure 6:
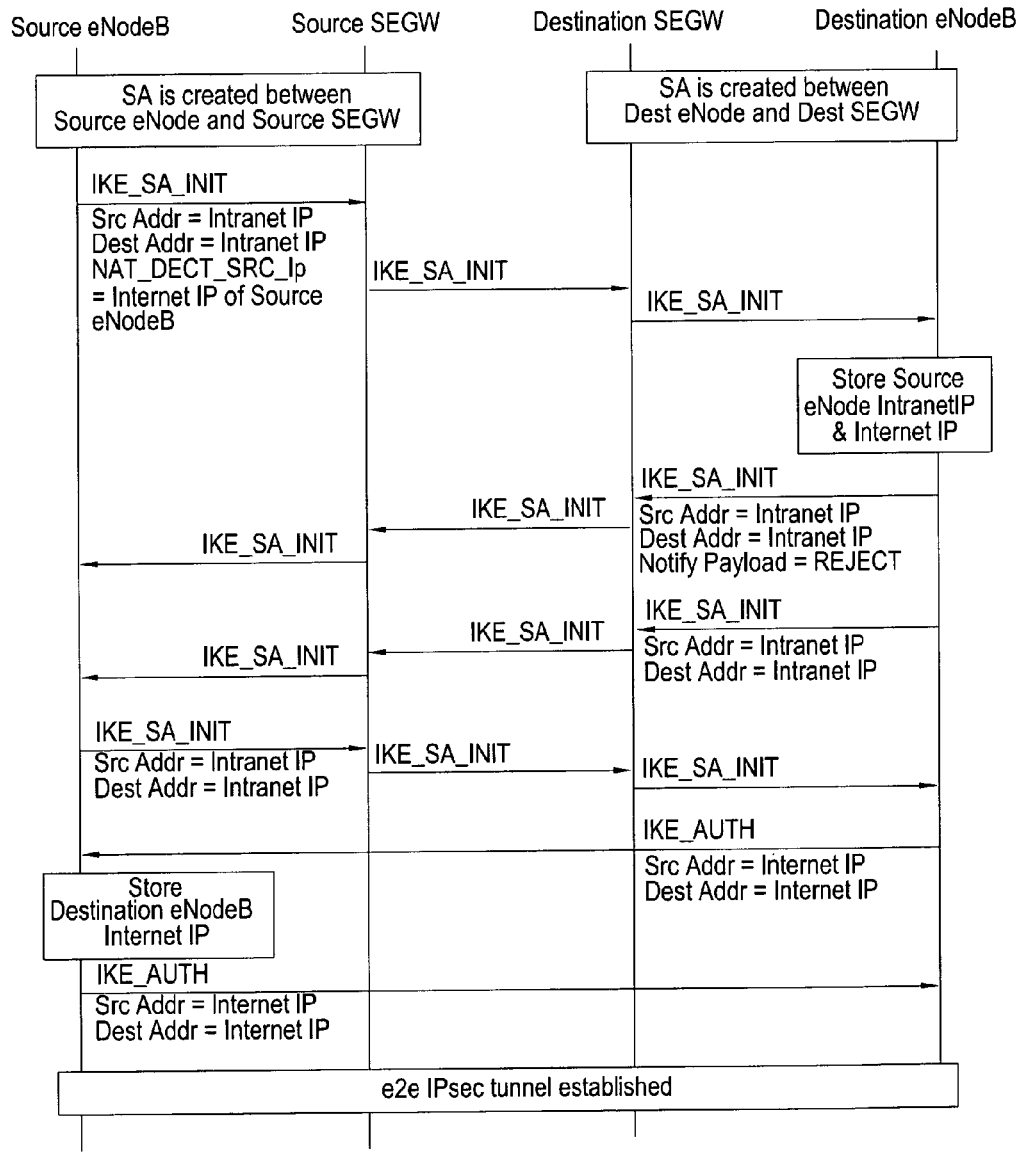
FIG. 6 is a sequence diagram illustrating an alternative embodiment of a method for setting up a peer-to-peer tunnel.

An alternative solution for the case when the destination eNodeB detects that it is located in the Internet behind a NAT, requires that the source eNodeB include in the IKE_SA_INIT (at step 2 above), a Notify Payload with NAT_DETECTION_SOURCE_IP included. The value of the source IP in the NAT detection payload would be the Internet IP-address of the source eNodeB. Since the destination eNodeB knows that it is behind a NAT, it will reject the IKE_SA_INIT signal, store the Internet IP-address of the source eNodeB retrieved from the NAT detection payload, and again initiate the same sequence starting with the sending of the IKE_SA_INIT towards the source eNodeB. The advantage of this method is that no external IP address lookup is required. The signalling flow associated with this approach is illustrated in FIG. 6.

2. IPSec in IPSec for X2 Setup on eNodeB in Unsecure Domain Behind NAT

Unlike the first approach described above, this second approach can be applied in the case where both of the eNodeBs are located behind a NAT. It can also be applied where one or both of the eNodeBs are not located behind a NAT. For the purpose of the following discussion, it will be assumed that neither eNodeB is behind a NAT.

A prerequisite for this approach is that an IKE SA must be established between each SEGW and eNodeB. Such an IKE SA would have been established for the S1 communication. The source eNodeB shall also have at least the following information:
1. Topology location of source eNodeB
2. Topology location of destination eNodeB
3. Intranet IP address to destination eNodeB An eNodeB connected to the Internet should establish an extra child SA (that is in addition to the ordinary child SA established to carry data between the eNodeB and the core network) with no authentication and null encryption (ENCR_NULL) on the established IPSec tunnel between eNodeB and SEGW, i.e. on the IPSec tunnel established for the S1 communication. This new eNodeB-SEGW child SA will be used for the X2 interface and can be established already at the time of initial creation of the IPSec tunnel, for example for the S1 interface. An eNodeB connected to the Internet should furthermore be prepared to receive IKE connection attempts on the ordinary eNodeB-SEGW child SA, i.e. on the ESP payload.

When a source eNodeB needs to establish an X2 connection to a destination eNodeB, and the source eNodeB knows that both eNodeBs are attached to the Internet, the source eNodeB will establish a new standard IKE SA and child SA towards destination eNodeB through the eNodeB-SEGW ordinary child SA. These SAs are established end-to-end between the eNodeBs, and the child SA can be established in either IPSec AH or IPSec ESP, in transport mode or in tunnel mode. Use of ESP transport mode would decrease the overhead of the packets transmitted.

Figure 7:
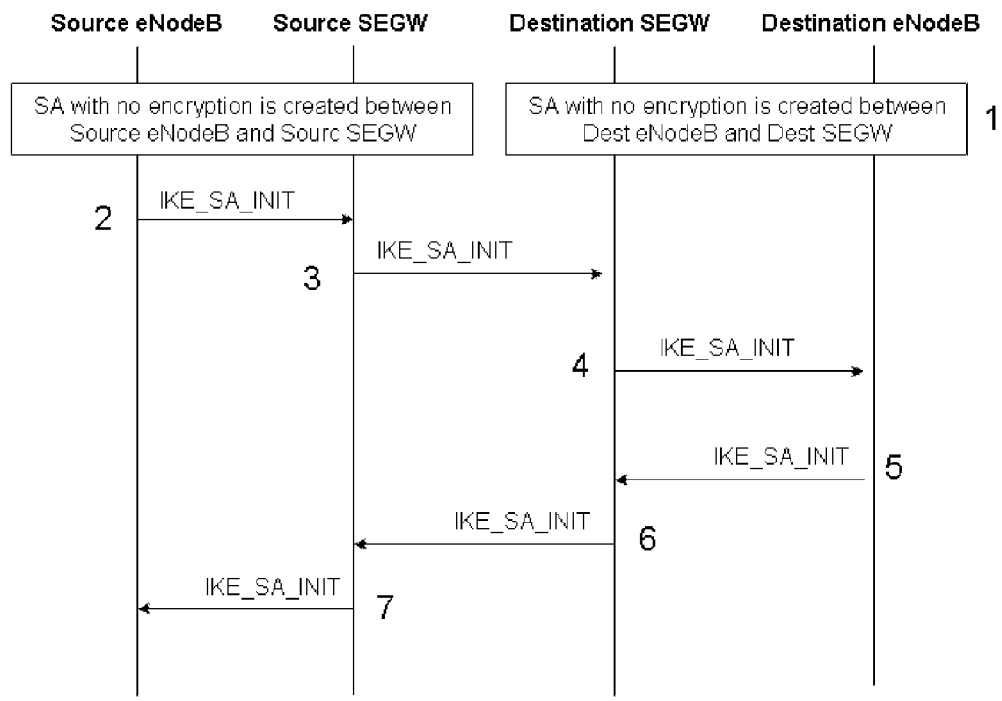
FIG. 7 is a sequence diagram illustrating an exemplary IKEv2 exchange between eNodeBs, and the IPSec messages after the child SA establishment is done, using the IKE_SA_INIT exchange as example.

FIG. 7 shows an example IKEv2 exchange between eNodeBs, and the IPSec messages after the child SA establishment is done, using the IKE_SA_INIT exchange as example. The steps in the flow are as follows:
1. Ordinary child SAs with encryption and authentication, and separate child SAs with no encryption (and no subsequent authentication) are established between the SEGW and eNodeBs, i.e. one ordinary child SA and one "separate" child SA between the source eNodeB and source SEGW and another pair of child SAs between the destination eNodeB and destination SEGW. Specific Traffic selector initiator/responder (TSi and TSr) values are used for the separate child SAs in order to specify that these SAs are used for peer-to-peer IPsec data transport, i.e. X2 interface/connection establishment and other related traffic between eNodeBs. The X2 interface/connection establishment and other related traffic is made using the ESP protocol (end-to-end). The specific TSi and TSr can for example indicate UDP ports 500 and 4500 for the end-to-end IKEv2 signaling and/or the ESP protocol for the end-to-end ESP protocol. It is assumed that these ordinary and separate child SAs are established already at the time of initial creation of the IPSec tunnel for the S1 interface.

It is also important to highlight that the eNodeBs do not need to perform any authentication of each other as it is assumed that the SEGW has already performed the authentication of the eNodeBs at the establishment of the initial IPSec tunnel (i.e. IKE SA, ordinary SA and separate SA), for example for the S1 interface. Additionally, it is also assumed that different SEGWs belong to the same operator in the target network, and that these SEGWs also trust each other.

2. An IKE_SA_INIT request is sent from the source eNodeB. This message will be sent through the ordinary child SA established in step 1 above. The Source SEGW sees the packet as any other IP packet.

3. The IKE_SA_INIT request message will be routed from source SEGW to destination SEGW using normal IP routing between these SEGWs. The Destination SEGW sees the packet as any other IP packet.
4. The IKE_SA_INIT request is sent to the destination eNodeB. This message will be sent through the ordinary child SA established in step 1 above.
5. An IKE_SA_INIT response is sent from the destination eNodeB. This message will be sent through the ordinary child SA established in step 1. The Destination SEGW handles the packet as any normal IP packet.
6. The IKE_SA_INIT response message will be routed from the destination SEGW to source SEGW using normal IP routing between these SEGWs. The Source SEGW sees the packet as any normal IP packet.
7. The IKE_SA_INIT response is sent to the source eNodeB. This message will be sent through the ordinary SA established in step 1 above.

Again, it will be appreciated that the IKE_SA_INIT response message does not contain the CERTREQ parameter.

Once the source eNodeB has received the IKE_SA_INIT response, it can send out the IKE-AUTH and other peer-to-peer IKE SA messages, and the IPsec peer-to-peer data, via the separate child SA.

At this point, an end-to-end IKE SA exists between the source and destination eNodeBs, via the SEGWs, and based upon a secret shared between the eNodeBs. This means that the eNodeBs can exchange encrypted IKE SA packets including the IKE_AUTH, via the SEGWs. Subsequently, when the IKE_AUTH is exchanged, the X2 data can be transmitted via the established end-to-end child SA.

Figure 8:
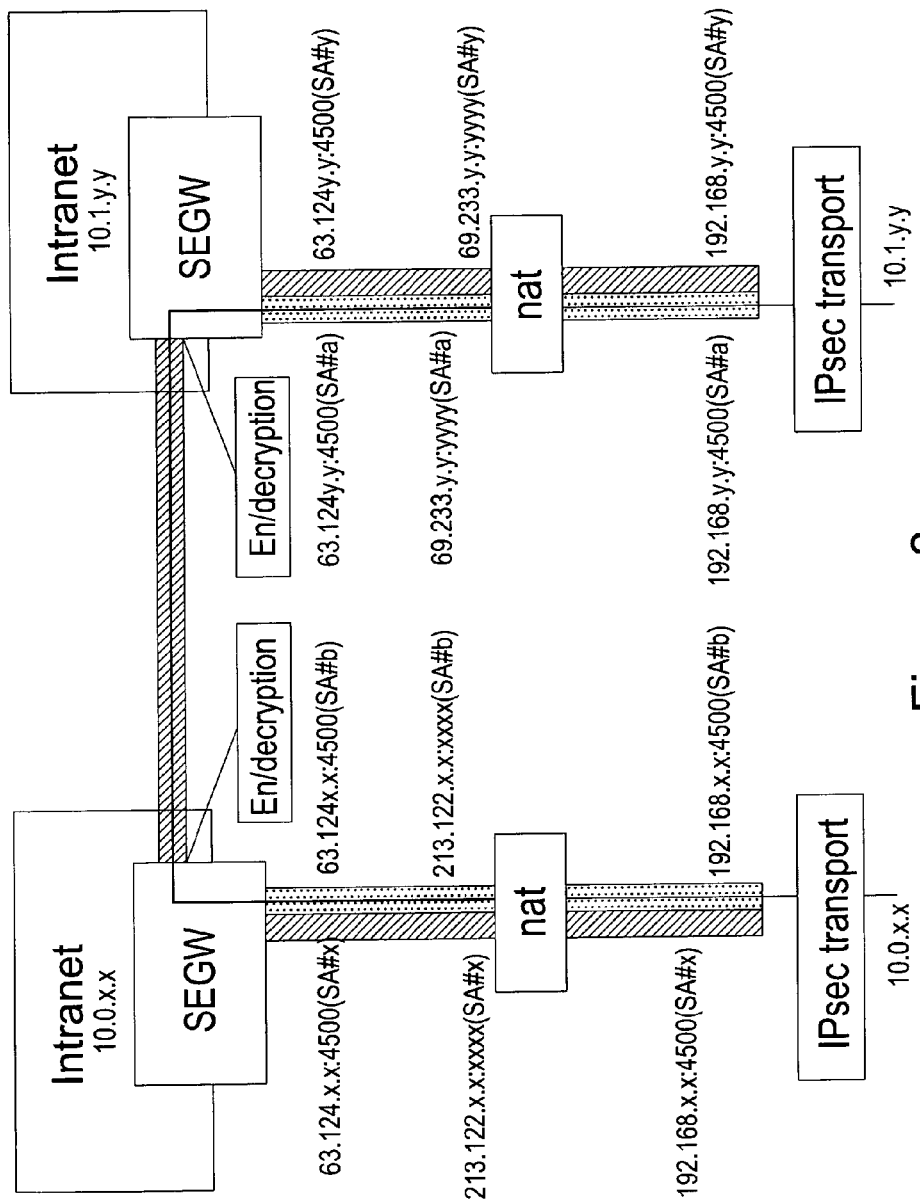
FIG. 8 is a simplified block diagram illustrating a connection between two SEGWs using IPSec.

An advantage of this solution is that no new, extended mechanisms or database nodes need to be introduced in the SEGW or in the Intranet. A potential disadvantage is that additional encryption and decryption might be unavoidable between the SEGWs if they are connected using IPSec as shown in FIG. 8. However, this particular disadvantage can be avoided if a separate child SA with no encryption is created between all SEGWs using some predefined TSi and TSr that uniquely identify the X2 interface, for example using similar TSi and TSr as described in step 1 above in relation to FIG. 7.

A disadvantage is that an additional header (and so additional protocol overhead) is introduced, as the new IPSec SA is implemented inside an IPSec tunnel.

It is optimal from a performance perspective that no authentication is used on the SA used for X2 communication. However, this may introduce a slight security risk given that IPSec packets could be injected on the unencrypted SA between source eNB and source SEGW, having the correct destination eNodeB intranet address (the Intranet address can be sniffed on the separated unencrypted SA). This could be mitigated by firewall functionality such as access control lists (ACL's) that filter on allowed IP addresses/ports or by using authentication (and accepting the resulting the processing penalty).

In the case that both the first and second approaches described above are available to the destination eNodeB, a mechanism may be required in order to inform the node of the approach to be applied. In order to simplify the implementation of IPsec at the destination eNodeB, such a mechanism may involve the eNodeB checking if a Notify Payload NAT_DETECTION_SOURCE_IP is included in the IKE_SA_INIT request message. If so, then the first approach involving the Internet will be used, otherwise the IPsec in IPsec X2 setup approach will be used.

3. Inter Base Station Interface Establishment

As with the second approach, the third approach that will now be described can be applied regardless of whether one or both or neither of the eNodeBs are located behind a NAT. For the purpose of the following discussion, it will be assumed however that neither eNodeB is behind a NAT. This example assumes that the source and destination eNodeB are connected to respective, different SEGWs, but the principle can also apply to the case where both eNodeBs are connected to the same SEGW.

This approach relies upon the forwarding of IPSec tunnels through SEGWs for eNodeBs, in order to gain processing time and processing capacity needed for the X2 interface. New message types on IKEv2 are introduced in order to distinguish between an ordinary IKEv2 exchange and a peer to peer IKEv2 exchange. Parameters TSi and TSr, together with the new message types, are used by SEGWs to route IKEv2 exchange message between the peers. The SPI is used by SEGW not only for identifying the IPSec SA, but also for routing IPSec packets between the peers.

A prerequisite for this approach is that an IKE SA must be established between the SEGW and eNodeB. For example, this IKE SA could have been established for the S1 interface. The source eNodeB shall also at least have the following information:
1. Topology location of source eNodeB (i.e. the source eNodeB is located within an unsecure domain)
2. Topology location of destination eNodeB (i.e. the destination eNodeB is located within an unsecure domain)
3. Intranet IP address of destination eNodeB The following information is optional for the source eNodeB and can be retrieved during later steps.
4. Destination eNodeB associated SEGW internet IP address
5. Destination eNodeB associated SEGW intranet IP address.

A new set of exchange types is created in order to make it possible to create peer to peer security associations between eNodeBs. These P2P IKEv2 exchange types are similar to the ordinary IKEv2 exchange types:

P2P_IKE_SA_INIT
P2P_IKE_AUTH
P2P_CREATE_CHILD_SA
P2P_INFORMATIONAL

When the source eNodeB needs to establish an X2 connection to the destination eNodeB (the different possible triggers to this are well known in 3GPP), it will initiate an IKE P2P exchange between the nodes. Each exchange message will be transmitted through the network according to the procedure illustrated in FIG. 9, taking the P2P_IKE_SA_INIT message exchange as an example. The illustrated steps are as follows:
1. An ordinary IKE SA has been established between the source eNodeB and source SEGW, and between the destination eNodeB and destination SEGW. For example, these IKE SAs could have been established for the S1-MME interfaces between the eNodeBs and the MMEs.

The source eNodeB shall at least have retrieved the following information:
   Source eNodeB topology location
   Destination eNodeB topology location
   Destination eNodeB intranet IP address.

The source eNodeB may also retrieve the following, optional information:
   Intranet IP address of the SEGW associated with the source eNodeB
   Internet IP address of the SEGW associated with the source eNodeB
   Intranet IP address of the SEGW associated with the destination eNodeB
   Internet IP address of the SEGW associated with the destination eNodeB.

2. Source eNodeB will send a P2P exchange type message to destination eNodeB via the ordinary IKE SA. The peer to peer connection is identified by exchange type parameters P2PSA (Security Association between the eNodeBs; in this case it identifies the IKE SA between the eNodeBs), Traffic Selector—Initiator ($TS_i$)=Source eNodeB intranet IP-address, and Traffic Selector—Responder ($TS_r$)=Destination eNodeB intranet IP-address.

For P2P_IKE_SA_INIT, the parameters $TS_i$ and $TS_r$ shall also contain the following information if available in the source eNodeB: The associated SEGW Internet IP-address and Intranet IP-address for both source eNodeB and destination eNodeB. This is made possible by having proprietary TS type on Traffic Selector instances.

3. When the source SEGW receives these P2P exchange type messages, instead of responding to this request to source eNodeB as in normal exchange types, it will first decrypt the message. In the case of a P2P_IKE_SA_INIT containing the associated SEGW Internet IP-address and Intranet IP-address for destination eNodeB, the source SEGW will register the destination eNodeB intranet IP address, destination SEGW intranet and internet IP addresses, using destination eNodeB intranet IP-address as key. [Otherwise, source SEGW may request this information from some database using destination eNodeB's intranet IP-address as key, and then register the associated SEGW addresses as described earlier.] For other P2P messages related to this session, the source SEGW will lookup the destination intranet and internet IP addresses of destination SEGW using $TS_r$ as key.

4. Source SEGW will now forward the P2P exchange type message to the destination SEGW which the destination eNodeB is connected to (i.e. using one of the destination SEGW IP addresses (Internet or intranet) from the P2P_IKE_SA_INIT). The reason for not routing the message directly to the destination eNodeB is that destination SEGW needs to have knowledge about the P2P SA in order to route the user data. The Internet IP address of the destination SEGW could be used, as the P2P exchange type messages are encrypted end-to-end. However, use of the Internet may increase the potential risk for external attacks towards the eNodeBs. However, this part could also be performed using the intranet IP address of the destination SEGW.

5. When the destination SEGW receives this P2P exchange type message, it will first perform a lookup to find the correct IKE SA towards the destination eNodeB, based on $TS_r$ in the received message. Then it will associate the P2P SA with the destination eNodeB in its SA routing table.

6. Destination SEGW will now forward the message to the destination eNodeB using the ordinary IKE SA.

7. Destination eNodeB will respond to the P2P exchange type messages (to the destination SEGW) using the ordinary IKE SA.

In case of P2P_IKE_SA_INIT, if the destination eNodeB has no knowledge of the source eNodeB, it will in this step register the intranet IP-address for the source eNodeB, and the associated SEGW Internet IP-address and Intranet IP-address for source eNodeB.

Figure 10:
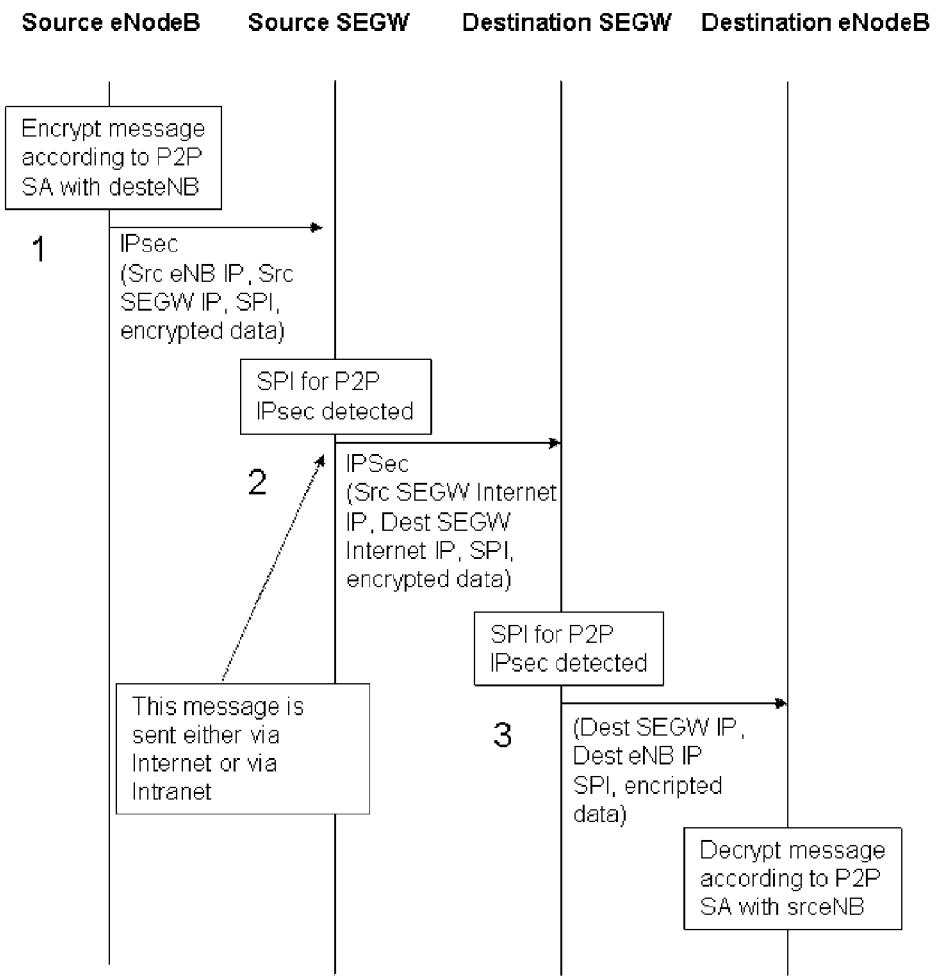
FIG. 10 is a sequence diagram illustrating a procedure to be executed when a source eNodeB wants to send an IP-packet to a destination eNodeB.

8. This step is similar to step 3 above
9. This step is similar to step 4 above
10. This step is similar to step 5 above
11. This step is similar to step 6 above After the Initial P2P IKE exchange, a P2P IKE SA and a P2P child SA have been established between the eNodeBs. When the source eNodeB wants to send an IP-packet to the destination eNodeB, the following procedure will be executed, as illustrated in FIG. 10:

1. The source eNodeB will send an IPSec packet to source SEGW with Security Parameter Index (SPI) set to the newly established P2P child SA towards the destination eNodeB.
2. When the source SEGW receives this IPSec packet, it can identify the packet using the SPI field. The packet will then be forwarded to the destination SEGW. This could be done via the Internet (in order to avoid eventual additional encryptions and descriptions caused by IPSec tunnels between the SEGWs). Another possibility involves forwarding the traffic using the Intranet through additional IPSec tunnels with NULL encryption established between the SEGW for X2 interfaces.
3. When the destination SEGW receives this IPSec packet (identified by the SPI field), it will forward the packet to the destination eNodeB.

Figure 11:
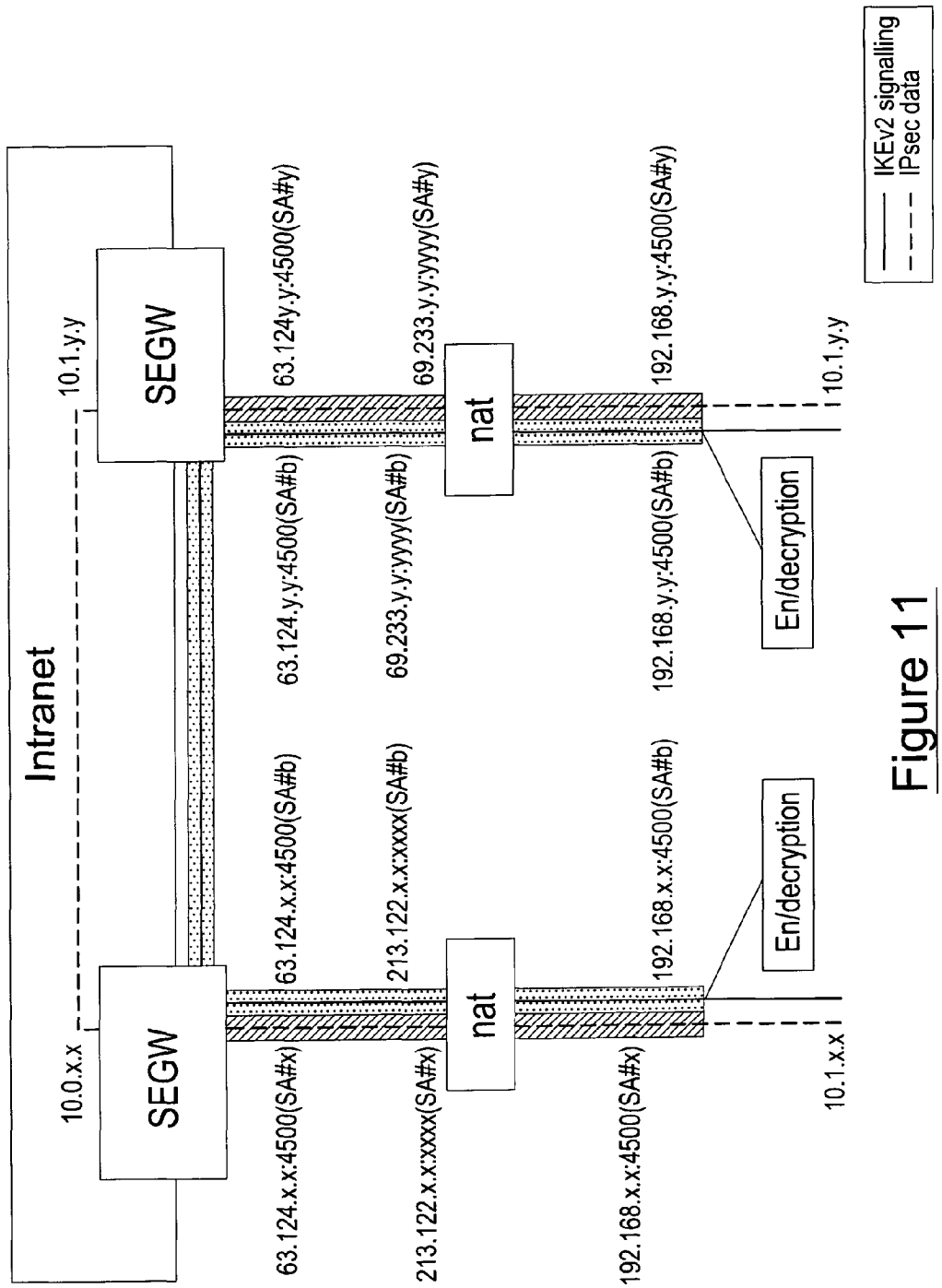
FIG. 11 is a simplified block diagram illustrating an end-to-end secure channel established between two eNodeBs.

Since a secret is shared between the source eNodeB and destination eNodeB, it will be impossible for any other party in the network to extract the contents (including the SEGWs). FIG. 11 illustrates the end-to-end secure channel established between the eNodeBs.

The advantage of this solution is that one encryption/decryption pair can be guaranteed between the eNodeBs, overhead on the header can be optimized, and no intranet IP addresses will be visible on the data messages. The disadvantage of this solution is that an extended solution should be implemented in both eNodeB and SEGW.

Figure 12:
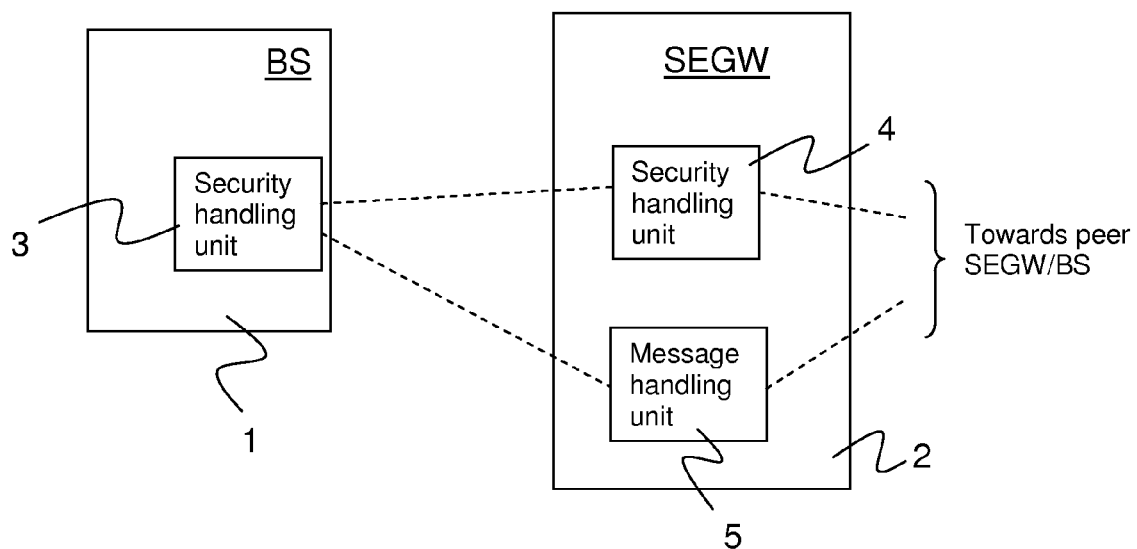
FIG. 12 is a schematic diagram illustrating a Base Station and a Security Gateway configured to facilitate the establishment of an end-to-end Security Association between Base Stations.

FIG. 12 illustrates schematically a Base Station (BS) 1 and a Security Gateway (SEGW) 2 configured to facilitate the establishment of an end-to-end Security Association between the illustrated BS 1 and a peer BS (not shown). The illustrated BS comprises a security handling unit 3 that establishes an initial security association with a security handling unit 4 of the SEGW 2, primarily for the purpose of allowing the BS to communicate securely with a core network. The SEGW 2 further comprises an IKE message handling unit 5 for relaying IKE initiation messages between the BSs.

The detailed message format for the P2P IKE exchange types is listed below. Abbreviations used can be found in RFC 4306, whilst the prefix 'P2P' indicates modified parameters.

P2P_IKE_SA_INIT
  Between SEGW and eNodeB
    HDR, SK {P2PSAi1, KEi, Ni, TSi, TSr}→
    ←HDR, SK {P2PSAr1, KEr, Nr, TSi, TSr}
  Between SEGWs
    HDR, P2PSAi1, KEi, Ni, TSi, TSr→
    ←HDR, P2PSAr1, KEr, Nr, TSi, TSr
P2P_IKE_AUTH
  Between SEGW and eNodeB
    HDR, SK {P2PSAi2, TSi, TSr, P2PSK {IDi, [CERT,] [CERTREQ,][P2PIDr,] AUTH, P2PTSi, P2PTSr}}→
    ←HDR, SK {P2PSAr2, TSi, TSr, P2PSK {IDr, [CERT,] AUTH, P2PTSi, P2PTSr}}
  Between SEGWs
    HDR, P2PSAi2, TSi, TSr, P2PSK {IDi, [CERT,] [CERTREQ,] [P2PIDr,]AUTH, P2PTSi, P2PTSr}→
    ←HDR, P2PSAr2, TSi, TSr, P2PSK {IDr, [CERT,] AUTH, P2PTSi, P2PTSr}
P2P_CREATE_CHILD_SA
  Between SEGW and eNodeB
    HDR, SK {[P2PN], P2PSA, TSi, TSr, P2PSK {Ni, [KEi,] [P2PTSi, P2PTSr]}}→
    ←HDR, SK {P2PSA, TSi, TSr, P2PSK {Nr, [KEr,] [P2PTSi, P2PTSr]}}
  Between SEGWs
    HDR, [P2PN], P2PSA, TSi, TSr, P2PSK {Ni, [KEi,] [P2PTSi, P2PTSr]}→
    ←HDR, P2PSA, TSi, TSr, P2PSK {Nr, [KEr,] [P2PTSi, P2PTSr]}
P2P_INFORMATIONAL
  Between SEGW and eNodeB
    HDR, SK {TSi, TSr, [P2PN], [P2PD], P2PSK {[CP,] ...}}→
    ←HDR, SK {TSi, TSr, [P2PN], [P2PD], P2PSK {[CP,] ...}}
  Between SEGWs
    HDR, TSi, TSr, [P2PN], [P2PD], P2PSK {[CP,] ...}→
    ←HDR, TSi, TSr, [P2PN], [P2PD], P2PSK {[CP,] ...}

It will be noted that the parameters TSi and TSr are introduced into all these messages. These two parameters are used for identification of the peer to peer connection.

The peer to peer IKE exchange is implemented in the same way as an ordinary IKE exchange. The exchange is done in the following way (compare to RFC 4306).

P2P Initial exchange
  P2P_IKE_SA_INIT→
  ←P2P_IKE_SA_INIT
  P2P_IKE_AUTH→
  ←P2P_IKE_AUTH
P2P Create child SA exchange
  P2P_CREATE_CHILD_SA→
  ←P2P_CREATE_CHILD_SA
P2P Informational exchange
  P2P_INFORMATIONAL→
  ←P2P_INFORMATIONAL Since the P2P IKE SA is created by the ordinary IKE SA, if the IKE SA is released, the P2P IKE SA (and its associated P2P child SA) will also be released.

The approaches to establishing the X2 interface described here may eliminate unnecessary encryption and decryption on the X2 interface between eNodeBs, and thereby gain both processing time and processing capacity. The approaches also reduce the complexity of the complex certification structure which is needed in order to establish reliable X2 connections between eNodeBs.

This principle underlying the described approaches could also be applied for technologies other than LTE, where connections are needed between two nodes in an unsecure domain. This principle could be applied for enterprise IP networks in which two clients, located in the unsecure domain, need to establish a peer to peer connection.

Although preferred embodiments of the present invention have been illustrated in the accompanying drawings and described in the foregoing detailed description, it is understood that the invention is not limited to the embodiments disclosed, but is capable of numerous rearrangements, modifications, and substitutions without departing from the scope of the invention.

The invention claimed is:

1. A method of establishing a peer-to-peer Internet Protocol Security (IPSec) security association between a pair of base stations located within a same or different radio access networks, and where the base stations communicate with a core network via a same or different security gateways of the core network using respective pre-established IPSec security associations, the method comprising:
exchanging peer-to-peer Internet Key Exchange (IKE) security association initiation request and initiation response messages between the base stations using the pre-established IPSec security associations.

2. The method according to claim 1, wherein IKE security association initiation request and initiation response messages are IKE security association initiation (IKE-SA-INIT) request and response messages.

3. The method according to claim 1 and further comprising, following an exchange of the IKE security association initiation request and initiation response messages, subsequently sending from an initiating base station initiating the peer-to-peer IPSec security association to a peer base station, an IKE authentication (IKE AUTH) message via an unsecured internet Protocol (IP) network.

4. The method according to claim 3 and further comprising, at the peer base station sending the IKE security association initiation (IKE-SA-INIT) response message, opening an appropriate port for receiving further messages.

5. The method according to claim 3 and further comprising User Datagram Protocol (UDP) encapsulating the IKE AUTH message.

6. The method according to claim 3, wherein the peer base station associates messages received from the initiating base station with the peer base station using only a Security Parameter Index assigned to the peer-to-peer IPSec security association.

7. The method according to claim 3, wherein the peer base station associates messages received from the initiating base station with the peer base station using a Security Parameter Index assigned to the peer to peer IPSec security association and an IP address of the initiating base station, the IP address of the initiating base station being conveyed to the peer base station as a NAT DETECTION SOURCE IP within a Notify payload of the IKE security association initiation request message.

8. The method according to claim 1 and further comprising exchanging the IKE security association initiation request and initiation response messages between the base stations via encrypted child security associations of the pre-established IPSec security associations existing between respective base station and security gateway pairs, wherein data secured with the peer-to-peer IPSec security association can be sent subsequently over child security associations with null encryption between the base station and security gateway pairs.

9. The method according to claim 1 and further comprising including in at least the IKE security association initiation request message a flag identifying to each security gateway that the peer-to-peer IPSec security association should be added to a Security Policy Database in association with an IP address of a peer base station, wherein data sent subsequently using the peer-to-peer IPSec security association can be forwarded by a security gateway without a need for payload encryption or decryption.

10. The method according to claim 1, further comprising:
at a base station sending the IKE security association initiation request message, determining whether or not a peer base station is located behind a Network Address Translator (NAT), and
determining how to proceed with a peer-to-peer security association establishment based thereon.

11. The method according to claim 1, wherein the base stations are eNodeBs within a Long Term Evolution (LTE)-based radio access network, and said core network is a System Architecture Evolution (SAE)-based network.

12. The method according to claim 1 further comprising determining whether subsequent messages after the IKE security association initiation request and initiation response messages are to be exchanged via the security gateways or via a public IP network, the step comprising:
in the former case, not including a public IP address of a base station initiating the peer-to-peer IPSec security association as a NAT DETECTION SOURCE IP within a Notify payload of the IKE security association initiation request message, and
in the latter case including the public IP address of he base station initiating the peer-to-peer IPSec security association as the NAT DETECTION SOURCE IP within the Notify payload of the IKE security association initiation request message.

13. A base station for use in a radio access network and configured to communicate with a core network via a security gateway of the core network using a pre-established Internet Protocol Security (IPSec) security association, the base station comprising:
a security handling unit operable on a processor and configured to exchange peer-to-peer Internet Key Exchange (IKE) security association initiation request and initiation response messages with a peer base station using the pre-established IPSec security association in order to establish a peer-to-peer security association with the peer base station.

14. The base station according to claim 13, wherein the security handling unit is configured to send to the peer base station, an IKE authentication (IKE AUTH) message via an unsecured IP network following an exchange of the IKE security association initiation request and initiation response messages.

15. The base station according to claim 13, wherein the security handling unit is configured to send to the peer base station, an IKE authentication (IKE AUTH) message via the security gateway following an exchange of the IKE security association initiation request and initiation response messages.

16. A security gateway for securely coupling one or more base stations within a radio access network, to a core network, the security gateway comprising:
a security handling unit for establishing a first security association to secure traffic exchanged between a first base station within the radio access network and the core network; and
a message handling unit for using the first security association to handle peer-to-peer Internet Key Exchange (IKE) security association initiation request and initiation response messages exchanged between the first base station and a peer base station, a message exchange resulting in an establishment of a peer-to-peer security association between the first and peer base stations, the message handling unit being configured to add a security parameter index for the peer-to-peer security association to a local Security Parameter Index (SPI) database together with a message handling instruction for causing packets matching the SPI to be routed onward towards a destination one of the first and peer base stations.

17. A method of enabling an establishment of a peer-to-peer Internet Protocol Security (IPSec) security association between a pair of base stations located within a same or different radio access networks and where at least one of the base stations is coupled to a core network via a security gateway, the method comprising, at the security gateway:

establishing a first security association to secure traffic exchanged between a first base station within the radio access network and the core network;

using the first security association to handle peer-to-peer Internet Key Exchange (IKE) security association initiation request and initiation response messages exchanged between the first base station and a peer base station, a message exchange resulting in an establishment of a peer-to-peer IPSec security association between the first and peer base stations, and adding a security parameter index for the peer-to-peer IPSec security association to a local Security Parameter Index (SPI) database together with a message handling instruction for causing packets matching the SPI to be routed onward towards a destination one of the first and peer base stations.

* * * * *

UNITED STATES PATENT AND TRADEMARK OFFICE
CERTIFICATE OF CORRECTION

PATENT NO.        : 8,484,473 B2
APPLICATION NO.   : 13/128477
DATED             : July 9, 2013
INVENTOR(S)       : Zee et al.

Page 1 of 2

It is certified that error appears in the above-identified patent and that said Letters Patent is hereby corrected as shown below:

On the Title Page, in Item (75), under "Inventors", in Column 1, Line 3, delete "Jarna" and insert -- Järna --, therefor.

In the Drawings

In Fig. 6, Sheet 6 of 12, delete "Store Source eNode IntranetIP & Internet IP" and insert -- Store Source eNode Intranet IP & Internet IP --, therefor.

In Fig. 7, Sheet 7 of 12, delete "Source eNodeB and Sourc SEGW" and insert -- Source eNodeB and Source SEGW --, therefor.

In Fig. 8, Sheet 8 of 12, delete "63.124y.y:4500(SA#y)" and insert -- 63.124.y.y:4500(SA#y) --, therefor.

In Fig. 8, Sheet 8 of 12, delete "63.124y.y:4500(SA#a)" and insert -- 63.124.y.y:4500(SA#a) --, therefor.

In Fig. 8, Sheet 8 of 12, delete "63.124x.x:4500(SA#b)" and insert -- 63.124.x.x:4500(SA#b) --, therefor.

Figure 9:
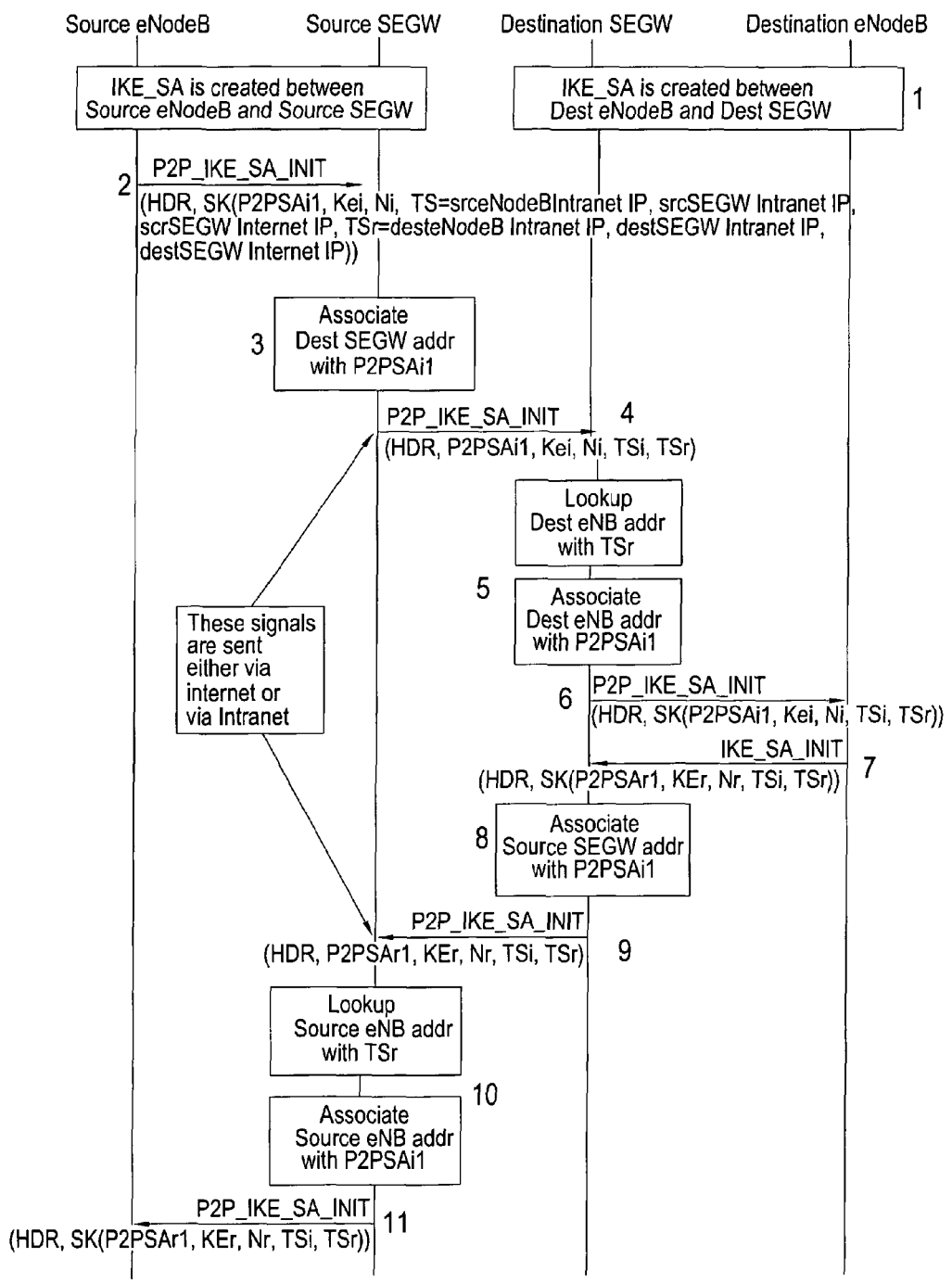
FIG. 9 is a sequence diagram illustrating an IKE P2P exchange between the nodes of the network, taking the P2P_IKE_SA_INIT message exchange as an example.

In Fig. 9, Sheet 9 of 12, in Step 2, Line 2, delete "TS=srceNodeBIntranet IP," and insert -- TS=srceNodeB Intranet IP, --, therefor.

In Fig. 11, Sheet 11 of 12, delete "63.124y.y:4500(SA#y)" and insert -- 63.124.y.y:4500(SA#y) --, therefor.

Signed and Sealed this
Twelfth Day of November, 2013

Teresa Stanek Rea
*Deputy Director of the United States Patent and Trademark Office*

CERTIFICATE OF CORRECTION (continued)
U.S. Pat. No. 8,484,473 B2

In the Specification

On Column 1, under Title, insert Heading -- CROSS REFERENCE TO RELATED APPLICATIONS --.

In Column 4, Lines 51-52, delete "messages" and insert -- messages. --, therefor.

In Column 5, Line 65, delete "eNodeB; and" and insert -- eNodeB; --, therefor.

In Column 5, Line 67, delete "eNodeBs." and insert -- eNodeBs; and --, therefor.

In the Claims

In Column 15, Line 43, in Claim 7, delete "peer to peer" and insert -- peer-to-peer --, therefor.

In Column 16, Line 22, in Claim 12, delete "he" and insert -- the --, therefor.

In Column 17, Line 19, in Claim 17, delete "stations, and" and insert -- stations; and --, therefor.